Patented Mar. 11, 1941

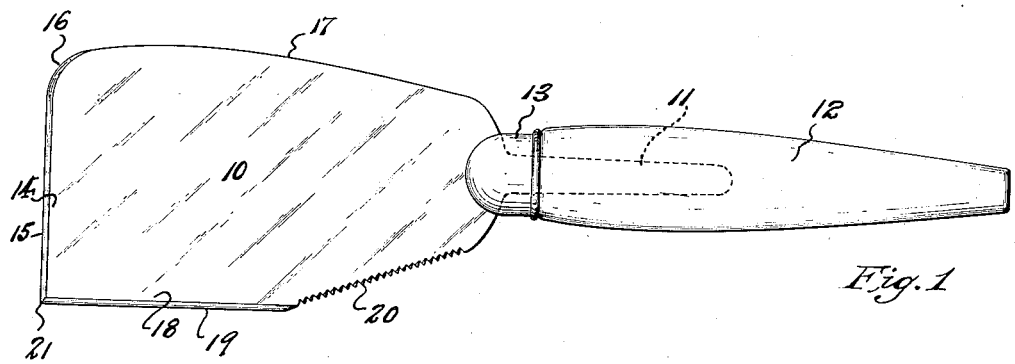
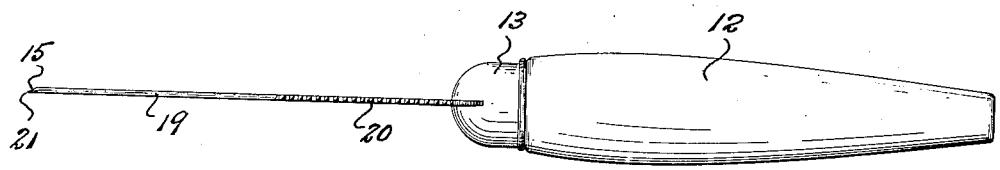
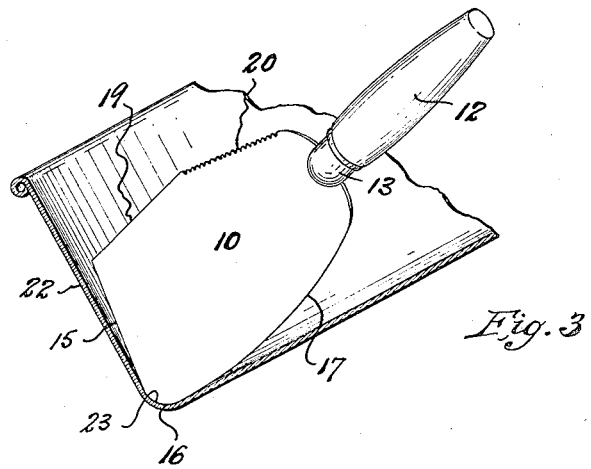

2,234,242

UNITED STATES PATENT OFFICE 2,234,242

CULINARY TOOL

Ida B. Gilbert, East Orange, N. J., assignor of one-half to Russell B. Kingman, Orange, N. J., and one-fourth to William A. Stewart, East Orange, N. J.

Application October 9, 1937, Serial No. 168,126

1 Claim. (Cl. 30—169)

This invention relates to an improved kitchen utensil or culinary tool; and the invention has reference, more particularly, to a novel construction of tool adapted to aid in the performance of a great many operations incident to the preparation and handling of materials for culinary purposes.

This invention has for its object to provide a novel form of culinary tool which is so constructed and devised as to be capable of use in cutting, chopping, sawing, scraping, turning and other operations commonly required in the preparation, cooking and handling of food materials.

The invention has for a further object to provide a simple unitary tool comprising a blade-like body and a handle therefor; said blade-like body being of unique shape and having a novel arrangement and disposition of cutting and scraping edges.

Other objects of this invention, not at this time more particularly enumerated, will be understood from the following detailed description of the same.

An illustrative embodiment of this invention is shown in the accompanying drawing, in which—

Fig. 1 is a side face view of the novel culinary tool according to this invention; Fig. 2 is a bottom edge elevation of the same; and Fig. 3 is a perspective view showing the operative application of the tool for scraping out and cleaning the interior corners of sauce pans, kettles, frying pans and similar cooking utensils.

Similar characters of reference are employed in the above-described views, to indicate corresponding parts.

Referring to said drawing, the reference character 10 indicates the blade body of the tool, the same having an axial shank portion 11 adapted to be inserted into and fixed to a handle portion 12, the latter having the inner end reenforcing ferrule 13 to aid in securing these parts in strongly associated assembled relation.

Said blade body 10 is of a maximum width at its free end portion, and is provided at its free end with a transverse end marginal portion 14 disposed at right angles to the longitudinal axis of the tool. Said transverse free end marginal portion 14 is provided with a suitably sharpened end cutting edge 15. Said transverse end marginal portion 14 terminates at its upper end in a curvilinear or rounded scraper edge 16 which merges with the top edge 17 of the blade body. Said top edge 17 is preferably of somewhat rearwardly and inwardly tapering conformation toward the handle portion.

Extending from the free marginal portion 14 of the blade body 10 is a longitudinal marginal edge portion 18 having a suitably sharpened bottom cutting edge 19 extending along a portion of the blade body and parallel to the longitudinal axis of the tool. From the rearward termination of said bottom cutting edge 19, the blade body is provided with a rearwardly and inwardly extending oblique marginal portion provided with saw teeth 20 leading back to the handle portion 12, and thus also serving to outwardly offset said bottom cutting edge 19, as well as to provide a section for sawing operations.

The juncture of the end cutting edge 15 and the bottom cutting edge 19 provides a sharpened angular puncturing point 21.

The novel culinary tool, constructed and formed as above described, is, by reason of its novel formation, adapted to perform a great many operations commonly required in kitchen work connected with the preparation, cooking and handling of food materials, and in connection with other utensils employed in such work.

Illustrative of the uses and advantages of the novel culinary tool are the following:

Used as a knife for cutting operations, the longitudinal cutting edge 19 is advantageously disposed for most cutting and slicing effects.

For use in cutting cake, particularly iced cakes and layer cakes, the tool offers marked efficiency, since the piercing or puncturing point 21 will break through the icing with minimum lateral crumbling or cracking effect, whereupon the bottom cutting edge 19 will easily shear through the cake body. These advantages are likewise afforded in connection with the cutting of pies, since the angular point 21 may be quickly and easily passed around the edges of the pie tin or plate, to loosen the crust, and said point 21 also possesses the same advantages above mentioned in that it easily and quickly penetrates the top and bottom crust with minimum crumbling, so that the cutting edge 19 can quickly shear through the pie with desired cutting effect, and after completing the cutting operation the body of the blade can be conveniently used to lift away the cut section of the pie.

The end cutting edge 15, being transverse to the longitudinal axis of the tool, is disposed for convenient use as a chopping edge, especially for chopping material in a chopping bowl; and also for chopping cooked vegetables, such as cabbage, spinach, etc., in the pot before serving.

The bottom edge 19 is disposed for convenient use in chopping and cubing or dicing vegetables, such as parsley, onions, carrots and other raw vegetables, on the surface of a board. The saw toothed portion 20, being close to the handle, can be conveniently used for sawing operations, such as cutting through bones, etc.

Due to the broad paddle-like shape of the blade body and its transverse square end, the tool is very convenient for use as a turner for turning cooking foods, or as a spatula for removing cooked foods from the frying pan, as well as for many similar operations.

By reason of the provision of the rounded scraper edge 16, the tool is also most suitably adapted for scraping encrusted food particles from the interior of utensils in which the food has been cooked. The use of the tool for such and kindred operations is illustrated in Fig. 3 of the drawing, wherein a sauce-pan or similar utensil 22 is provided with round bottom corners 23, ordinarily very difficult to cleanse or scrape. With the instant tool, the application of said scraper edge 16 to the interior rounded corner renders the rapid removal of encrustations therefrom by a scraping action very easy.

Various additional uses for the novel tool of this invention, other than those above mentioned, will be readily suggested to the housewife out of her daily experiences with the many operations required in the exercise of culinary art.

Having described my invention, I claim:

A culinary tool comprising an imperforate blade body having a square outer end of substantial width transverse to its longitudinal axis and a relatively narrow shank portion aligned with said longitudinal axis to extend from its inner end, a handle member in which said shank portion is embedded, a sharpened right-angled cutting edge extending along the square outer end of said blade body and along a portion of one longitudinal margin thereof, said cutting edge terminating in a curved extension at the juncture of said square outer end and the opposite longitudinal margin of said blade body, and said blade body having an inwardly inclined cutaway portion extending from the longitudinal part of said cutting edge toward said shank portion and handle member.

IDA B. GILBERT.